US010422347B2

(12) United States Patent
Sun et al.

(10) Patent No.: US 10,422,347 B2
(45) Date of Patent: Sep. 24, 2019

(54) BRAKING STRUCTURE FOR FAN

(71) Applicant: ASIA VITAL COMPONENTS (CHINA) CO., LTD., Shenzhen (CN)

(72) Inventors: Sung-Wei Sun, Shenzhen (TW); Hai-Yang Xiong, Shenzhen (CN); Jing Zhu, Shenzhen (CN)

(73) Assignee: Asia Vital Components (China) Co., Ltd., Shenzhen (CN)

( * ) Notice: Subject to any disclaimer, the term of this patent is extended or adjusted under 35 U.S.C. 154(b) by 219 days.

(21) Appl. No.: 15/429,171

(22) Filed: Feb. 10, 2017

(65) Prior Publication Data
US 2018/0231074 A1    Aug. 16, 2018

(51) Int. Cl.
| F04D 29/52 | (2006.01) |
| F04D 19/00 | (2006.01) |
| F16D 63/00 | (2006.01) |
| F04D 25/06 | (2006.01) |
| F04D 27/00 | (2006.01) |
| F16D 121/16 | (2012.01) |
| F16D 125/58 | (2012.01) |
| F16D 121/14 | (2012.01) |

(52) U.S. Cl.
CPC ......... *F04D 29/522* (2013.01); *F04D 19/002* (2013.01); *F04D 25/0613* (2013.01); *F04D 27/008* (2013.01); *F16D 63/00* (2013.01); *F16D 2121/14* (2013.01); *F16D 2121/16* (2013.01); *F16D 2125/582* (2013.01)

(58) Field of Classification Search
CPC ........ F04D 19/00; F04D 19/002; F04D 25/06; F04D 25/0613; F04D 27/08088; F04D 29/522; F16D 63/00
See application file for complete search history.

(56) References Cited

U.S. PATENT DOCUMENTS

| 3,095,766 A | * | 7/1963 | Cox | .................... F01P 5/043 |
| | | | | 416/170 R |
| 3,123,282 A | * | 3/1964 | Pothier et al. | ...... F04D 27/0292 |
| | | | | 415/123 |
| 3,575,527 A | * | 4/1971 | Watanabe | ............... F04D 25/08 |
| | | | | 416/169 A |
| 4,443,155 A | * | 4/1984 | Smith | ................... F03D 7/0248 |
| | | | | 416/133 |

(Continued)

FOREIGN PATENT DOCUMENTS

| CN | 205064177 U | 3/2016 |
| TW | 1357707 | 1/2010 |
| TW | M423403 U1 | 2/2012 |

*Primary Examiner* — John Kwon
*Assistant Examiner* — Johnny H Hoang
(74) *Attorney, Agent, or Firm* — C. G. Mersereau; DeWitt LLP

(57) ABSTRACT

A braking structure for fan includes a fan and a braking device connected to the fan. The braking device includes a first braking mechanism, a second braking mechanism and a support seat. The first braking mechanism is connected to a free end of a shaft of the fan, the second braking mechanism is fitted in the support seat, and the support seat is engaged with a bottom of a frame of the fan. When the fan is turned off, the braking device is no longer energized, bring the first and the second braking mechanism to engage with each other and accordingly produce a braking effect, so that the fan can more quickly stop rotating.

9 Claims, 7 Drawing Sheets

(56) References Cited

U.S. PATENT DOCUMENTS

| | | | | |
|---|---|---|---|---|
| 4,642,029 A * | 2/1987 | Cedoz | ............... | B64C 11/325 |
| | | | | 416/129 |
| 2007/0166167 A1* | 7/2007 | Fan | ............... | F04D 25/088 |
| | | | | 416/244 R |
| 2016/0069624 A1* | 3/2016 | Rollins | ............... | F04D 25/028 |
| | | | | 415/122.1 |
| 2016/0097298 A1* | 4/2016 | Becoulet | ............... | F01D 21/006 |
| | | | | 415/18 |

\* cited by examiner

BRAKING STRUCTURE FOR FAN

FIELD OF THE INVENTION

The present invention is related to a braking structure for fan, and more particularly, to a braking structure for fan that produces improved braking effect and has good compatibility with all types of fans.

BACKGROUND OF THE INVENTION

A fan is a main heat dissipation tool for a wide range of consumption products. When a consumption product has a system temperature that is too high, the fan mounted in the consumption product will be automatically actuated to lower the overall system temperature and achieve the purpose of heat dissipation. On the other hand, when the system temperature has lowered to a specific value, the fan will stop operating automatically. Conventionally, to prevent the consumption product from becoming burned-out due to an overheated system, a cooling fan is mounted in the system as an overheat protection. However, since most of the currently available consumption products include electronic elements that compute at a speed much higher than before and accordingly produce more heat during operation, the fans designed for these consumption products must also have a largely increased rotation speed to timely remove the large amount of heat produced by the electronic elements. Under this circumstance, even when the fan has been turned off, it will keep rotating inertially for a short period of time before it fully stops.

Presently, the braking of conventional DC (direct-current) fans is mainly achieved through circuit board design, and can be generally divided into two modes. The first mode of fan braking is known as "turn-on braking", which is performed via software processes. When the fan is turned on, a microcontroller unit (MCU) of the fan controls an H-bridge motor driving circuit for two lower MOS transistors (metal-oxide-semiconductor transistors) to be normally opened, so that the blades of the fan rotate to produce a magnetic field, which interacts with the magnetic field produced by a magnetic strip to thereby generate a resistance and achieve the braking effect. The second mode of fan braking is known as "turn-off braking", which is performed via hardware. For example, a capacitor energy storage device is used to supply power to the H-bridge motor driving circuit of the fan when the fan is turned off, so that the two lower MOS transistors are normally opened to form a short circuit at two ends of the H-bridge that are connected to a motor coil of the fan. At this point, since the motor poles are prevented from producing any change, it is able to achieve the braking effect.

In summary, according to the conventional fan braking techniques, either an additional braking circuit must be provided on the original fan circuit board or an MCU with a braking-mode function must be installed in the fan to achieve the braking effect. However, the conventional fan braking modes based on circuit design can only bring the rotating fan blades to stop rotating gradually instead of quickly stopping the blades. Further, it is known the printed circuit boards of all types of fans already have wirings and circuits provided between various electronic elements for intended functions and has not extra space for directly forming additional fan braking circuits thereon. That is, the manufacturers have to use a new circuit board and modify the original fan circuit design to allow the provision of the additional fan braking circuit on the circuit board. In other words, the conventional fan braking modes have low compatibility with existing fans.

SUMMARY OF THE INVENTION

A primary object of the present invention is to overcome the disadvantages of the conventional fan braking techniques by providing a braking structure for fan, of which a first and a second braking mechanism of a braking device engage with each other when the fan is turned off to thereby produce a braking effect on the fan.

Another object of the present invention is to provide a braking structure for fan that has good compatibility with all types of fans.

To achieve the above and other objects, the braking structure for fan according to the present invention includes a fan and a braking device. The fan includes a frame and a fan wheel. The frame has a shaft holder provided therein, and the shaft holder defines a first opening and a second opening that are communicable with each other. The fan wheel is received in the frame and includes a shaft rotatably fitted in the shaft holder, and a free end of the shaft is extended through the first opening into the shaft holder to be located between the first and the second opening. The braking device includes a first braking mechanism, a second braking mechanism and a support seat. The first braking mechanism is connected to the free end of the shaft fitted in the shaft holder; the second braking mechanism is fitted in the support seat; and the support seat is engaged with the second opening of the shaft holder. When the fan is turned off, the braking device is not energized, bringing the first and the second braking mechanism to engage with each other and accordingly, produce a braking effect on the fan. With the above arrangements, the braking structure for fan according to the present invention provides improved braking effect and has very good compatibility with all types of fans.

In an operable embodiment of the present invention, the first braking mechanism includes a first brake unit having a plurality of wedge-shaped first teeth formed on an end surface of the first brake unit; and the first brake unit is connected at another opposite end surface to the free end of the shaft fitted in the shaft holder.

In an operable embodiment of the present invention, the second braking mechanism includes a second brake unit and a magnetic valve unit. The second brake unit has a plurality of wedge-shaped second teeth, which are formed on an end surface the second brake unit and configured for engagement with the first teeth or disengagement from the first teeth. The magnetic valve unit is located in the support seat with an end connected to another opposite end surface of the second brake unit.

In an operable embodiment of the present invention, the first teeth are respectively provided on one side surface with a first engaging surface for clockwise or counterclockwise unidirectional engagement; and the second teeth are respectively provided on one side surface with a second engaging surface for counterclockwise or clockwise unidirectional engagement, so that the first engaging surfaces and the second engaging surfaces can be brought to engage with or disengage from one another.

In an operable embodiment of the present invention, the magnetic valve unit includes an elastic element, a magnetic valve core and a magnetic valve body. The magnetic valve body internally defines an axial central hole and has an electromagnetic coil wound around an outer side thereof.

The magnetic valve core has an end connected to the other end surface of the second brake unit and another end extended into the central hole of the magnetic valve body. The elastic element is received in the central hole and located between the magnetic valve core and the magnetic valve body. When the magnetic valve body is in an energized state, it is able to magnetically attract the magnetic valve core thereto and accordingly brings the magnetic valve core to move in the central hole toward a bottom of the central hole to compress the elastic element.

In an operable embodiment of the present invention, when the magnetic valve body is no longer energized, the compressed elastic element produces an elastic restoring force to push the magnetic valve core toward the first brake unit.

In an operable embodiment of the present invention, the support seat includes a radially outward flange portion and a fastening portion. The flange portion is located on around an outer surface of the support seat and has an end surface tightly abutted on an outer side of a bottom of the shaft holder; and the fastening portion is axially extended from an end of the support seat into the second opening of the shaft holder to fasten the support seat to the frame.

In an operable embodiment of the present invention, the elastic element is a coil spring.

In an operable embodiment of the present invention, the magnetic valve body is internally provided with at least one limiting groove, which is radially outward formed on an inner wall surface of the central hole and is communicable with the central hole; and the magnetic valve core is provided on an outer surface with at least one limiting rib. The limiting rib is able to extend into the limiting groove and is limited to slide upward and downward only in the limiting groove.

BRIEF DESCRIPTION OF THE DRAWINGS

The structure and the technical means adopted by the present invention to achieve the above and other objects can be best understood by referring to the following detailed description of the preferred embodiment and the accompanying drawings, wherein.

DETAILED DESCRIPTION OF THE PREFERRED EMBODIMENTS

The present invention will now be described with a preferred embodiment thereof and by referring to the accompanying drawings.

Figure 1A:
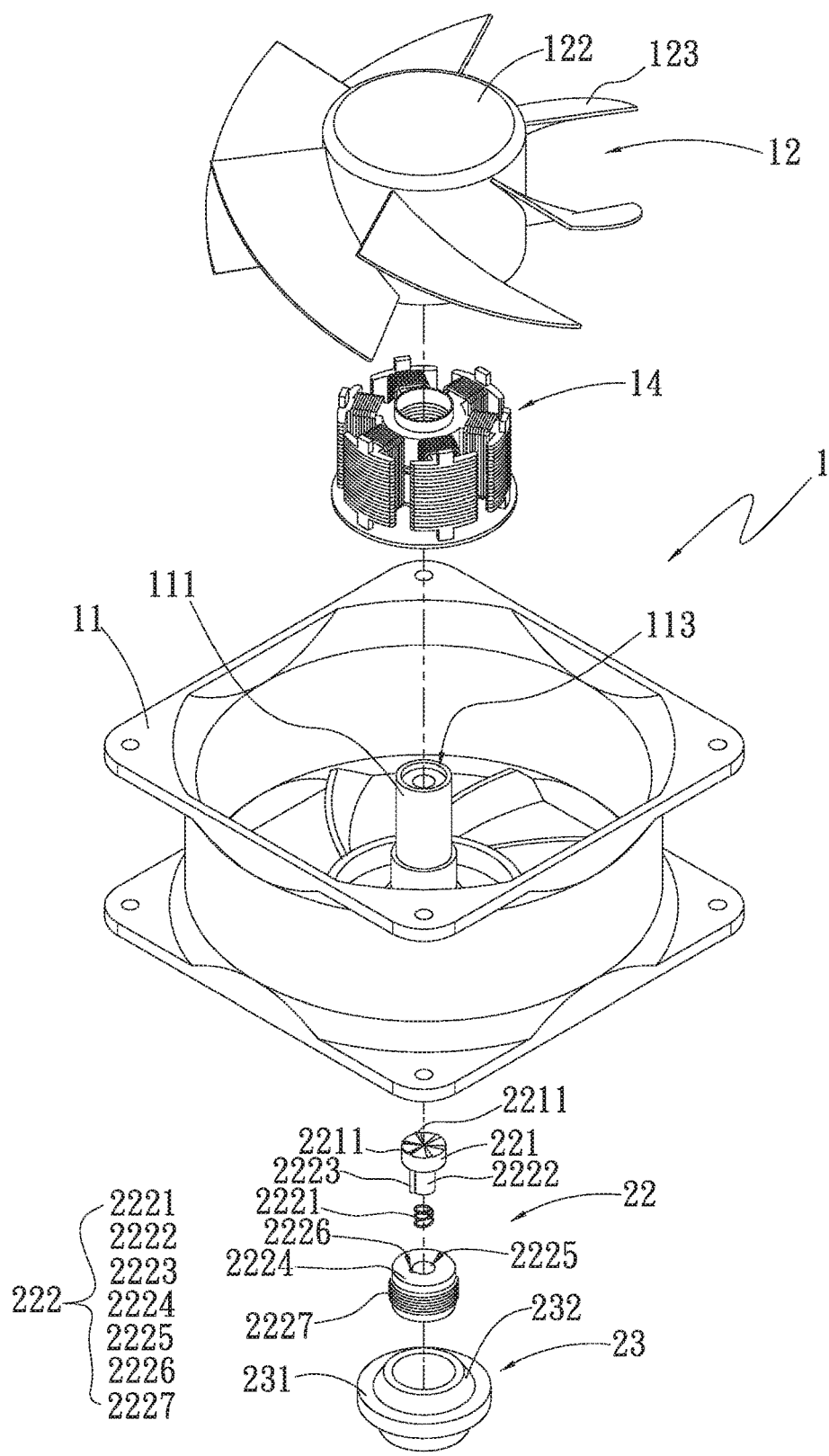
FIG. 1A is an exploded top perspective view showing the braking structure for fan according to a preferred embodiment of the present invention.
Figure 1B:
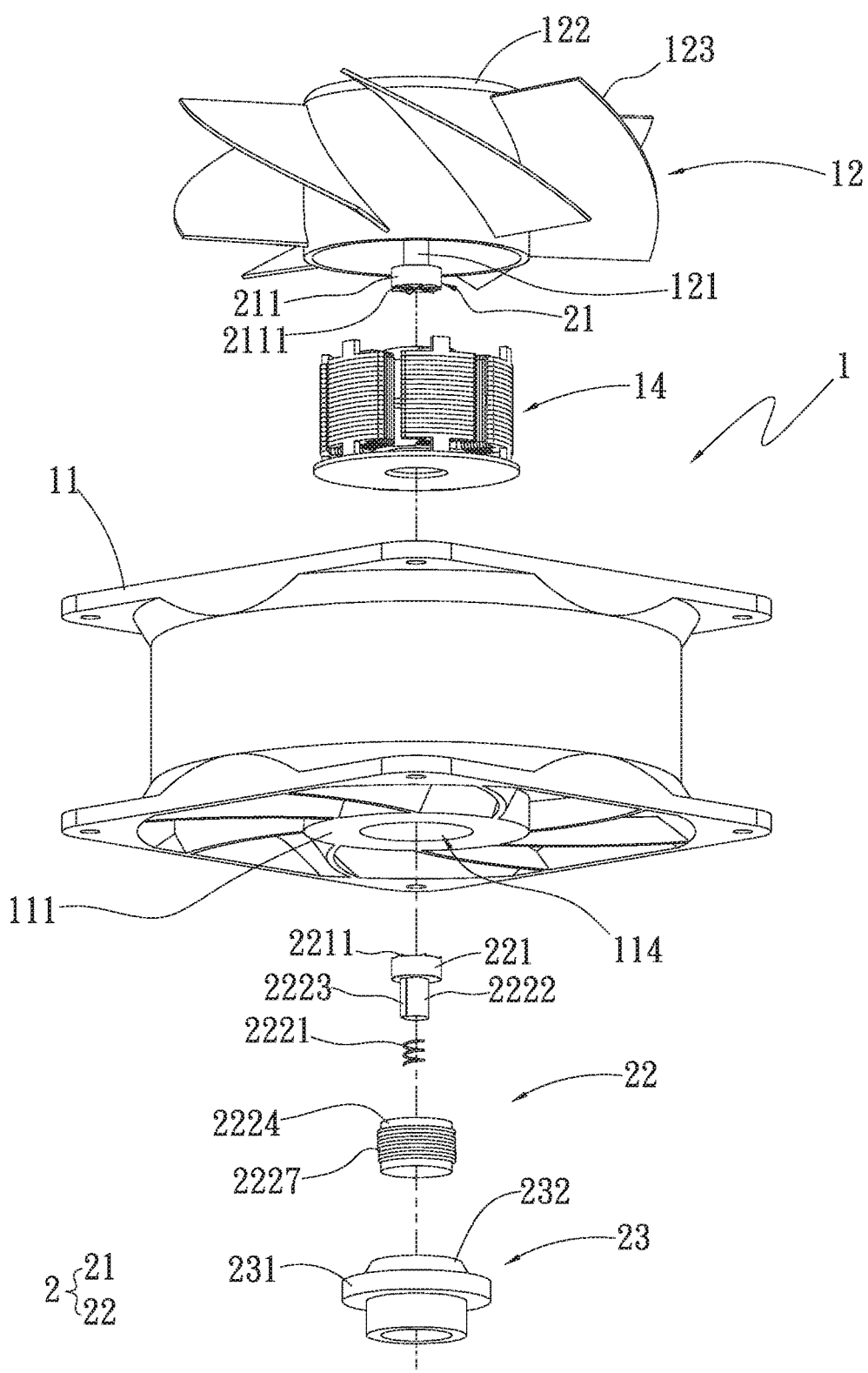
FIG. 1B is an exploded bottom perspective view of the braking structure for fan shown in FIG. 1A.
Figure 2:
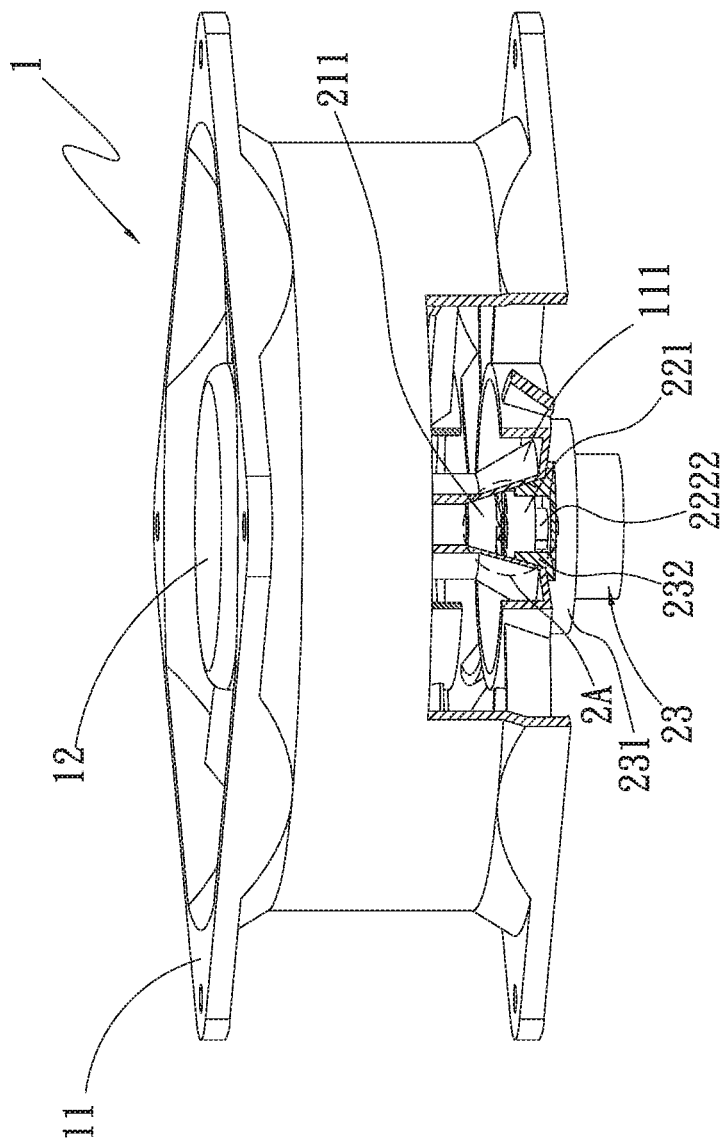
FIG. 2 is a cutaway view of the braking structure for fan according to the preferred embodiment of the present invention.
Figure 3:
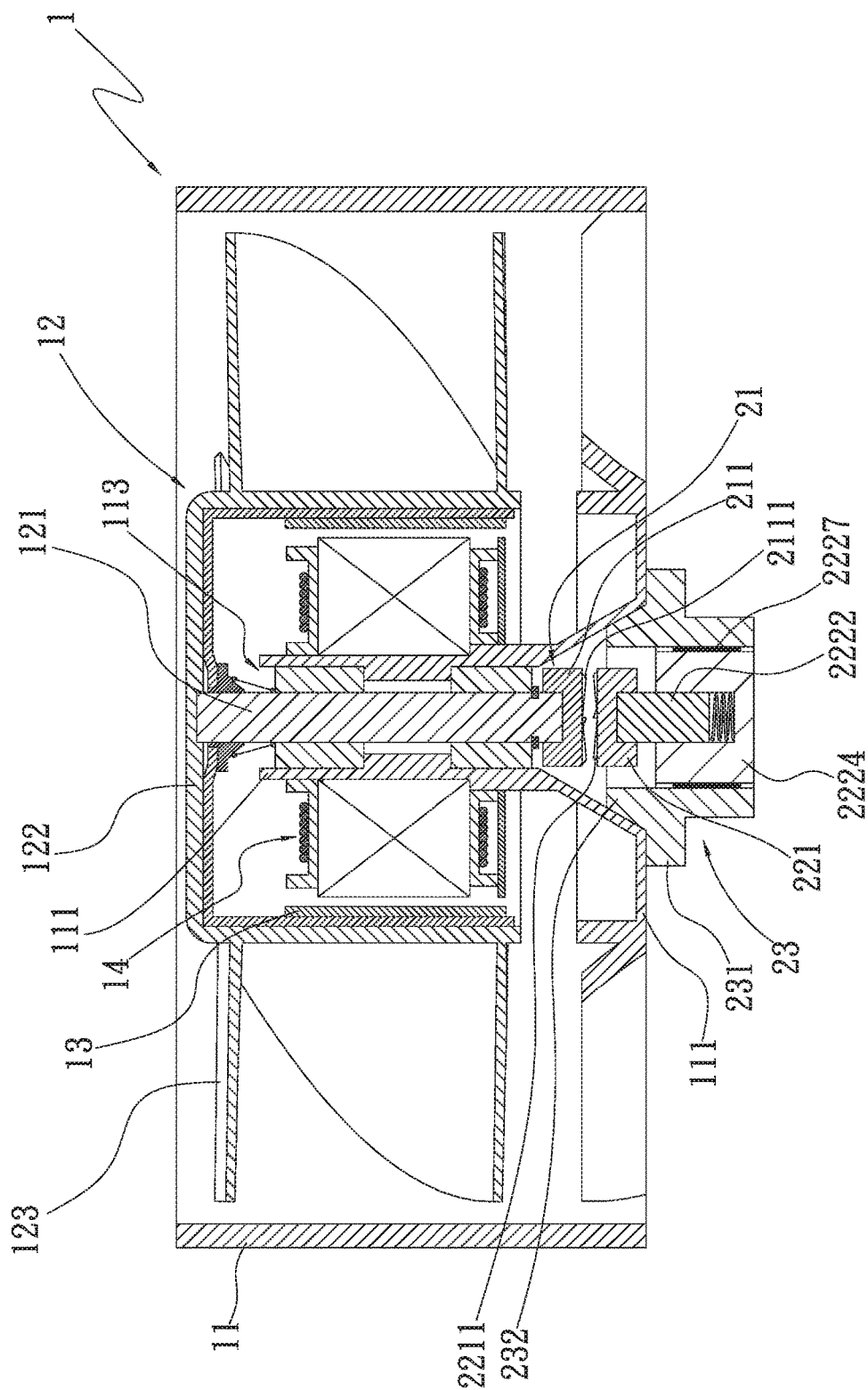
FIG. 3 is an assembled sectional view of the braking structure for fan according to the preferred embodiment of the present invention.

Please refer to FIGS. 1A and 1B that are exploded top and bottom perspective views, respectively, of a braking structure for fan according to a preferred embodiment of the present invention, and to FIGS. 2 and 3 that are cutaway view and assembled sectional view, respectively, of the braking structure for fan shown in FIGS. 1A and 1B. As shown, the braking structure for fan includes a fan 1 and a braking device 2. The fan 1 includes a frame 11 and a fan wheel 12. The frame 11 has a shaft holder 111, which is centered in the frame 11 and has a first opening 113 and an opposite second opening 114. The first opening 113 is located at an end of the shaft holder 111 facing toward the fan wheel 12. The second opening 114 is communicable with the first opening 113 and located at a bottom of the frame 11. A stator assembly 14 having a plurality of coils wound thereon is fitted around an outer side of the shaft holder 111. The fan wheel 12 is received in the frame 11 and includes a shaft 121, a hub 122, and a plurality of blades 123 formed on an outer surface of the hub 122. An end of the shaft 121 is a free end, which is rotatably fitted in the shaft holder 111. Another end of the shaft 121 is located in the hub 122 and connected to a center thereof. The free end of the shaft 121 is extended through the first opening 113 into the shaft holder 111 and located between the first and the second opening 113, 114. A magnetic element 13, such as a magnet, is fitted in the hub 122 to interact with the stator assembly 14 for producing excitation current.

Figure 2A:
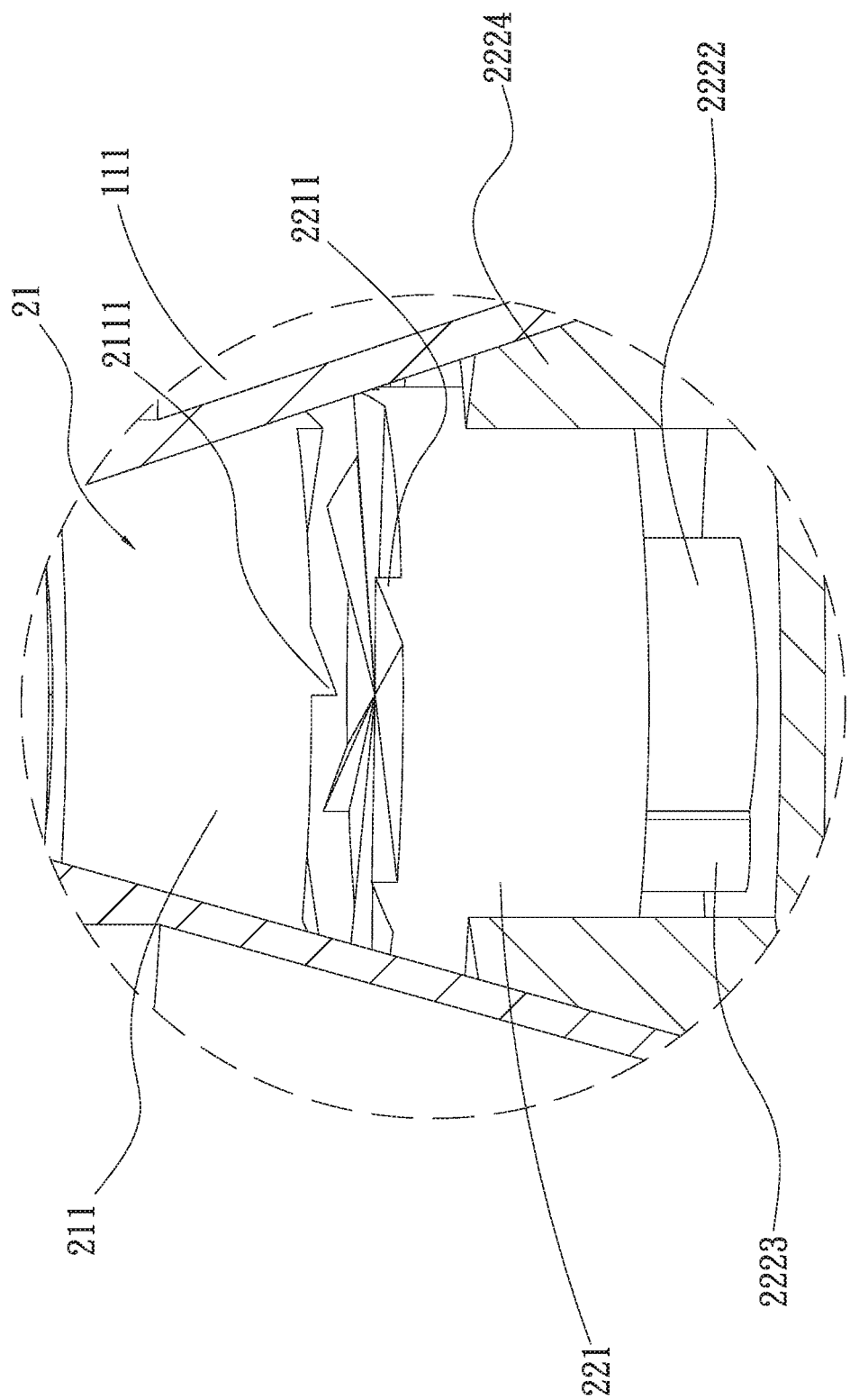
FIG. 2A is an enlarged view of the circled area 2A of FIG. 2, showing a braking device of the braking structure is in a disengaged state.
Figure 2B:
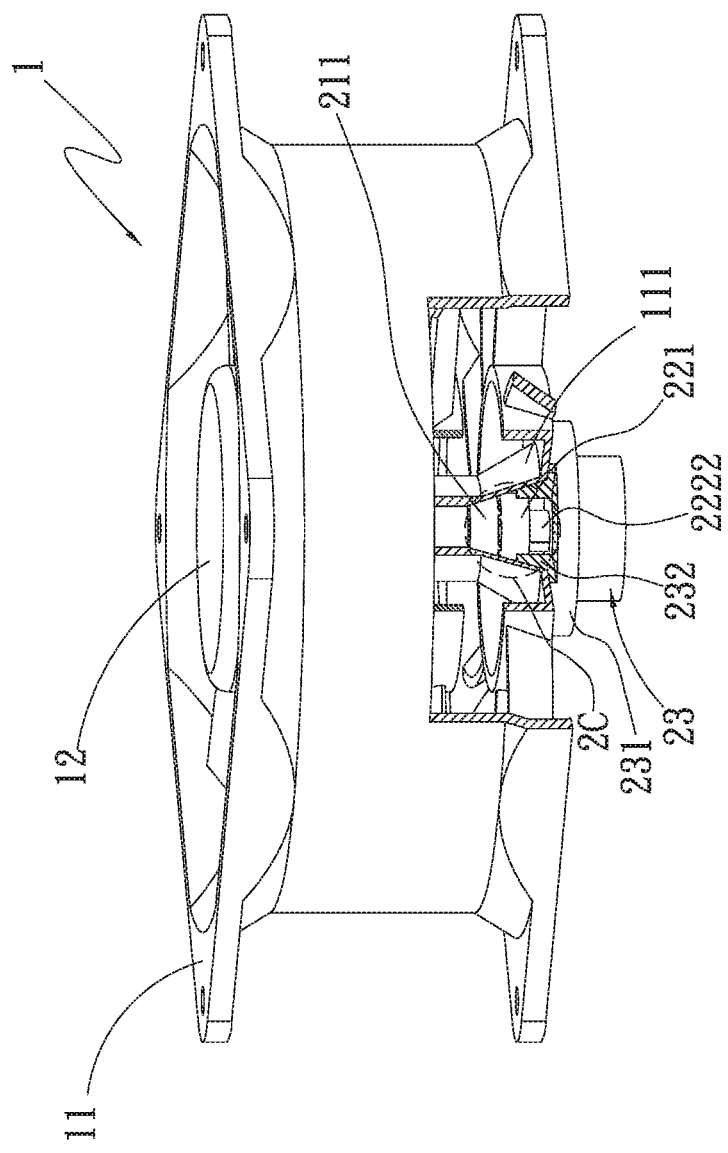
FIG. 2B is another cutaway view of the braking structure for fan according to the preferred embodiment of the present invention.
Figure 2C:
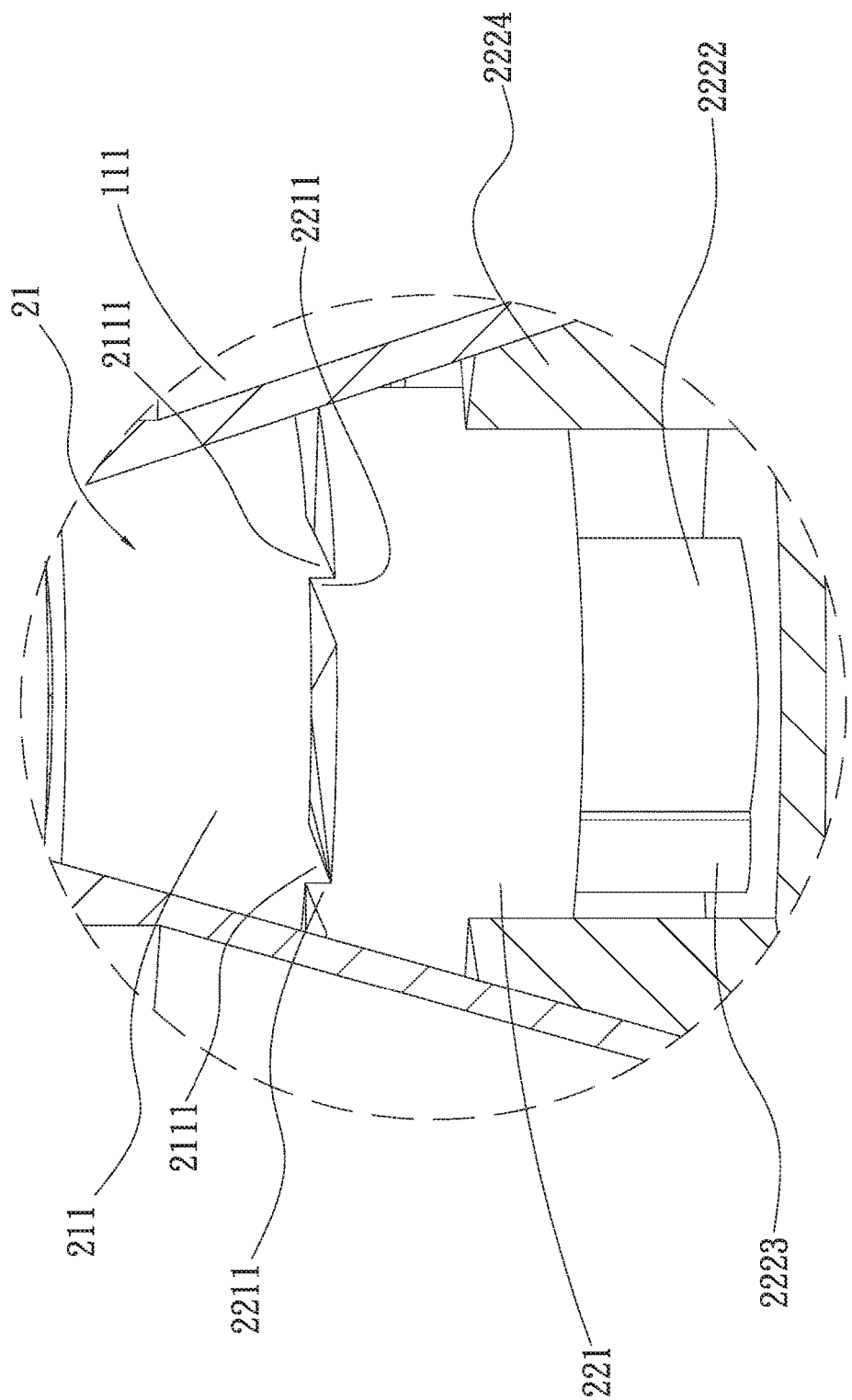
FIG. 2C is an enlarged view of the circled area 2C of FIG. 2B, showing the braking device of the braking structure is in an engaged state.

The braking device 2 includes a first braking mechanism 21, a second braking mechanism 22 corresponding to the first braking mechanism 21, and a support seat 23. The first braking mechanism 21 is connected to the free end of the shaft 121 fitted in the shaft holder 111, the second braking mechanism 22 is fitted in the support seat 23, and the support seat 23 is engaged with the second opening 114 of the shaft holder 111. The first braking mechanism 21 includes a first brake unit 211 having a plurality of wedge-shaped first teeth 2111 formed on an end surface thereof. Another end surface of the first brake unit 211 is connected to the free end of the shaft 121 fitted in the shaft holder 111. The second brake mechanism 22 includes a second brake unit 221 and a magnetic valve unit 222. The second brake unit 221 has a plurality of wedge-shaped second teeth 2211, which are formed on an end surface of the second brake unit 221 and configured for engagement with the first teeth 2111 (e.g. unidirectional engagement) or disengagement from the first teeth 2111. When the fan 1 is turned on to operate, the braking device 2 is excited, bringing the first teeth 2111 of the first braking mechanism 21 and the second teeth 2211 of the second braking mechanism 22 to disengage from one another, as shown in FIG. 2A. On the other hand, when the fan 1 is turned off, the braking device 2 is not excited, bringing the first teeth 2111 of the first braking mechanism 21 and the second teeth 2211 of the second braking mechanism 22 to engage with one another, as shown in FIG. 2C.

In practical implementation of the present invention, the first and the second teeth 2111, 2211 are not necessarily limited to the wedge shape but can be any two mating shapes formed on two facing end surfaces of the first and the second brake unit 211, 221 that allow the first and the second teeth 2111, 2211 to be joined together or engaged with one another to achieve the purpose of braking. For example, the first teeth 2111 can be protrusions formed on the end surface of the first brake unit 211 while the second teeth 2211 can be correspondingly configured holes formed on the end surface of the second brake unit 221, or the first teeth 2111 can be holes formed on the end surface of the first brake unit 211 while the second teeth 2211 can be correspondingly configured protrusions formed on the end surface of the second brake unit 221, such that the protrusions and the holes can be engaged with one another to brake the fan operation or be disengaged from one another to resume the fan operation. When the fan 1 is turned off, the engagement of the first teeth 2111 in the form of protrusions or holes with the second teeth 2211 in the form of corresponding holes or protrusions can also prevent the fan wheel 12 from rotating reversely to produce a counter-electromotive force.

The magnetic valve unit 222 is located in the support seat 23 with an end connected to another end surface of the second brake unit 221. The magnetic valve unit 222 includes an elastic element 2221, a magnetic valve core 2222 and a magnetic valve body 2224. The magnetic valve body 2224 is received in the support seat 23 and internally defines an axial central hole 2225. The magnetic valve core 2222 has an end connected to the other end surface of the second brake unit 221 and another end extended into the central hole 2225. The elastic element 2221 is received in the central hole 2225 and located between the magnetic valve core 2222 and the magnetic valve body 2224. In the illustrated preferred embodiment, the elastic element 2221 is a coil spring. The elastic element 2221 received in the central hole 2225 has an end in contact with the other end of the magnetic valve core 2222, and another end in contact with a bottom in the central hole 2225.

The magnetic valve body 2224 has an electromagnetic coil 2227 wound around an outer side thereof. The electromagnetic coil 2227 has two ends separately electrically connected to a positive and a negative terminal of a power supply to the fan 1. When the fan 1 is turned on to operate, the electromagnetic coil 2227 also receives the power supply and converts electrical energy into magnetic energy, so that the magnetic valve body 2224 is energized and produces a magnetic force to magnetically attract the magnetic valve core 2222 thereto. The magnetically attracted magnetic valve core 2222 moves downward in the central hole 2225 toward the bottom thereof, such that the other end of the magnetic valve core 2222 pushes against the elastic element 2221, bringing the elastic element 2221 into an elastically compressed state, as shown in FIG. 3. At this point, the second teeth 2211 on the second brake unit 221 and the first teeth 2111 on the first brake unit 211 are disengaged from one another without producing any braking effect, as shown in FIGS. 2 and 2A. On the other hand, when the fan 1 is turned off, no power will be supplied to the electromagnetic coil 227 either. As a result, the electromagnetic coil 2227 is no longer energized and does not produce any magnetic force to magnetically attract the magnetic valve core 2222 thereto. At this point, the magnetic valve core 2222 can no longer press against the elastic element 2221, allowing the elastic element 2221 to restore from the compressed state and generate an elastic force, which pushes the magnetic valve core 2222 back to an initial position, that is, the position of the non-energized magnetic valve core 2222. Meanwhile, the magnetic valve core 2222 biased by the elastic force of the elastic element 2221 brings the second brake unit 221 to move toward the first brake unit 211, causing the second teeth 2211 on the second brake unit 221 to engage with the first teeth 2111 on the first brake unit 211, as shown in FIGS. 2B and 2C, to thereby produce a braking effect on the fan 1.

Further, the magnetic valve body 2224 is internally provided with at least one limiting groove 2226, which is radially outward formed on an inner wall surface of the central hole 2225 to communicate with the central hole 2225. Also, the magnetic valve core 2222 is provided on an outer surface with at least one limiting rib 2223 for correspondingly extending into the limiting groove 2226, so that the limiting rib 2223 is limited to slide upward and downward only in the limiting groove 2226. The support seat 23 is provided with a radially outward flange portion 231 and an axially outward extended fastening portion 232. The flange portion 231 is located on around an outer surface of the support seat 23. When the support seat 23 is assembled to the frame 11, an end surface of the flange portion 231 is tightly abutted on an outer side of a bottom of the shaft holder 111, and the fastening portion 232 is axially extended from an end of the support seat 23 into the second opening 114 of the shaft holder 111 to fasten the support seat 23 to the frame 11.

With the above arrangements, the braking structure for fan according to the present invention can effectively provide improved braking effect to the fan. When the fan 1 is turned off, the engagement of the first teeth 2111 of the first brake unit 211 of the first braking mechanism 21 with the second teeth 2211 of the second brake unit 221 of the second braking mechanism 22 can more quickly stop the fan wheel 12 from rotating compared to the conventional braking circuit. Moreover, since the braking structure for fan provided according to the present invention is provided as a peripheral device with good compatibility, it can be used with all types of fans without the need of changing their existing circuit boards.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A braking structure for fan, comprising:
   a fan including a frame and a fan wheel; the frame having a shaft holder provided therein, and the shaft holder defining a first opening and a second opening that are communicable with each other; and the fan wheel being received in the frame and including a shaft rotatably fitted in the shaft holder, and a free end of the shaft being extended through the first opening into the shaft holder to be located between the first and the second opening; and
   a braking device including a first braking mechanism, a second braking mechanism and a support seat; the first braking mechanism being connected to the free end of the shaft fitted in the shaft holder, the second braking mechanism being fitted in the support seat, and the support seat being engaged with the second opening of the shaft holder;
   wherein when the fan is turned off, the braking device is de-energized, allowing the first and the second braking mechanism to engage with each other and accordingly, produce a braking effect on the fan.

2. The braking structure for fan as claimed in claim 1, wherein the first braking mechanism includes a first brake unit having a plurality of wedge-shaped first teeth formed on an end surface of the first brake unit; and the first brake unit being connected at another opposite end surface to the free end of the shaft fitted in the shaft holder.

3. The braking structure for fan as claimed in claim 2, wherein the second braking mechanism includes a second brake unit and a magnetic valve unit; the second brake unit having a plurality of wedge-shaped second teeth formed on an end surface of the second brake unit and configured for engagement with the first teeth or disengagement from the first teeth; and the magnetic valve unit being located in the support seat with an end of the magnetic valve unit connected to another opposite end surface of the second brake unit.

4. The braking structure for fan as claimed in claim 3, wherein the magnetic valve unit includes an elastic element, a magnetic valve core and a magnetic valve body; the magnetic valve body internally defining an axial central hole and having an electromagnetic coil wound around an outer side thereof; the magnetic valve core having an end connected to the other end surface of the second brake unit and another end extended into the central hole of the magnetic valve body; the elastic element being received in the central hole and located between the magnetic valve core and the magnetic valve body; and the magnetic valve body in an energized state being able to magnetically attract the magnetic valve core thereto and accordingly bring the magnetic valve core to move in the central hole toward a bottom of the central hole to compress the elastic element.

5. The braking structure for fan as claimed in claim 4, wherein, when the magnetic valve body is no longer energized, the compressed elastic element produces an elastic restoring force to push the magnetic valve core toward the first brake unit.

6. The braking structure for fan as claimed in claim 1, wherein, when the fan is turned on to operate, the brake device is energized, bringing the first and the second braking mechanism to disengage from each other and accordingly, no longer produce any braking effect on the fan.

7. The braking structure for fan as claimed in claim 4, wherein the support seat includes a radially outward flange portion and a fastening portion; the flange portion being located on around an outer surface of the support seat and having an end surface tightly abutted on an outer side of a bottom of the shaft holder; and the fastening portion being axially extended from an end of the support seat into the second opening of the shaft holder to fasten the support seat to the frame.

8. The braking structure for fan as claimed in claim 4, wherein the elastic element is a coil spring.

9. The braking structure for fan as claimed in claim 4, wherein the magnetic valve body is internally provided with at least one limiting groove, which is radially outward formed on an inner wall surface of the central hole and is communicable with the central hole, and wherein the magnetic valve core is provided on an outer surface with at least one limiting rib; and the limiting rib being able to extend into the limiting groove and being limited to slide upward and downward only in the limiting groove.

* * * * *